United States Patent
Fan et al.

(10) Patent No.: US 7,792,324 B2
(45) Date of Patent: *Sep. 7, 2010

(54) SYSTEM AND METHOD FOR EMBEDDING MINIATURE SECURITY MARKS

(75) Inventors: Zhigang Fan, Webster, NY (US); William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/502,987

(22) Filed: Aug. 11, 2006

(65) Prior Publication Data

US 2008/0037822 A1 Feb. 14, 2008

(51) Int. Cl.
*G06K 9/00* (2006.01)
(52) U.S. Cl. ..................... 382/100
(58) Field of Classification Search ................. 382/100
See application file for complete search history.

(56) References Cited

U.S. PATENT DOCUMENTS

| | | |
|---|---|---|
| 6,694,042 B2 | 2/2004 | Seder et al. |
| 7,002,704 B1 | 2/2006 | Fan |
| 2006/0115110 A1 | 6/2006 | Rodriguez et al. |

FOREIGN PATENT DOCUMENTS

| | | |
|---|---|---|
| EP | 0917113 B | 8/2004 |
| EP | 1059800 B | 11/2005 |

OTHER PUBLICATIONS

Theodoridis, S., et al.: Pattern Recognition, Passage Pattern Recognition, Academic Press, Jan. 1, 1999, pp. 238-241, San Diego, CA.
U.S. Appl. No. 11/317,768, filed Dec. 23, 2006, Zhigang Fan.
U.S. Appl. No. 11/472,695, filed Jun. 22, 2006, Zhigang Fan.

*Primary Examiner*—Charles Kim
*Assistant Examiner*—Nirav G Patel
(74) *Attorney, Agent, or Firm*—MH2 Technology Law Group LLP

(57) ABSTRACT

A method is provided for embedding miniature security marks within documents and images, utilizing a mark parameters database, graphical user interface, and detection simulator. The method includes predicting detection error rates for each pixel location of a host image, defined as a digital representation of at least one recipient of the miniature security marks. The detection error rates for each pixel are displayed with the host image on a graphical user interface and the desired miniature security mark locations are selected. At least one set of miniature security mark parameters is identified, with the parameters being mark parameters that enable determination of an optimized balance between detectability and visibility of the miniature security marks. The host image with the miniature security mark is displayed on the graphical user interface for review and adjustment by an operator.

20 Claims, 5 Drawing Sheets

SYSTEM AND METHOD FOR EMBEDDING MINIATURE SECURITY MARKS

CROSS-REFERENCE TO RELATED APPLICATIONS

The following co-pending application, U.S. application Ser. No. 11/502,808, filed Aug. 11, 2006, titled "System and Method for Detection of Miniature Security Marks", is assigned to the same assignee of the present application. The entire disclosure of this co-pending application is totally incorporated herein by reference in its entirety.

BACKGROUND AND SUMMARY

This disclosure relates generally to methods and systems for counterfeit prevention, and more particularly to a system and method for automatically embedding miniature security marks in documents or images.

Current counterfeit prevention systems are mainly based on the use of digital watermarks, a technique which permits the insertion of information (e.g., copyright notices, security codes, identification data, etc.) to digital image signals and documents. Such data can be in a group of bits describing information pertaining to the signal or to the author of the signal (e.g., name, place, etc.). Most common watermarking methods for images work in spatial or frequency domains, with various spatial and frequency domain techniques used for adding watermarks to and removing them from signals.

For spatial digital watermarking the simplest method involves flipping the lowest-order bit of chosen pixels in a gray scale or color image. This works well only if the image will not be subject to any human or noisy modification. A more robust watermark can be embedded in an image in the same way that a watermark is added to paper. Such techniques may superimpose a watermark symbol over an area of the picture and then add some fixed intensity value for the watermark to the varied pixel values of the image. The resulting watermark may be visible or invisible depending upon the value (large or small, respectively) of the watermark intensity.

Spatial watermarking can also be applied using color separation. In this approach, the watermark appears in only one of the color bands. This type of watermark is visibly subtle and difficult to detect under normal viewing conditions. However, when the colors of the image are separated for printing or xerography, the watermark appears immediately. This renders the document useless to the printer unless the watermark can be removed from the color band. This approach is used commercially for journalists to inspect digital pictures from a photo-stockhouse before buying un-watermarked versions.

There are several drawbacks to utilizing digital watermarking technology. To retrieve a watermark, extraction hardware and/or software is generally employed. Because a digital watermark usually has a fairly large footprint, detectors employed to read the digital watermarks often require significant buffering storage, which increases detection costs.

An alternate counterfeit prevention system, miniature security marks, may be utilized to remedy this problem. Miniature Security Marks (MSMs) are composed of small, virtually invisible marks that form certain configurations. The MSMs can be embedded in documents or images to be protected. When the documents or images are scanned, processed, and sent to a printer, the MSM detectors in the imaging system may recognize the embedded MSM marks and defeat the counterfeit attempts. The MSM has an advantage over existing technologies, such as watermarking, in that it requires only very simple and inexpensive detectors. Consequently, the MSM may be applied to many devices in a cost-effective manner.

Embedding MSMs in an image is a complicated process involving determination of the best mark locations and adjusting mark parameters. As usually multiple conflicting requirements such as higher detection rate and lower visibility exist, a try-and-error approach requires skill and experience. Additionally, it is labor intensive and usually does not yield optimal results. In order to remedy this problem as well as other problems, a system and method need to be developed to assist in the MSM embedding process.

All U.S. patents and published U.S. patent applications cited herein are fully incorporated by reference. The following patents or publications are noted:

U.S. Patent Application Publication No. 2006/0115110 to Rodriguez et al. ("Authenticating Identification and Security Documents") describes a system for authenticating security documents in which a document includes a first surface having a first and second set of print structures and a second surface. The sets of print structures cooperate to obscure the location on the first surface of the second set of print structures. The second set of print structures is arranged on the first surface so to provide a reflection pattern, such as a diffraction grating. The second set of print structures is preferably provided with metallic ink on the first surface.

U.S. Pat. No. 6,694,042 to Seder et al. ("Methods for Determining Contents of Media") enables a variety of document management functions by printing documents with machine readable indicia, such as steganographic digital watermarks or barcodes. The indicia can be added as part of the printing process (after document data has been output by an originating application program), such as by printer driver software, by a Postscript engine in a printer, etc. The indicia can encode data about the document, or can encode an identifier that references a database record containing such data. By showing the printed document to a computer device with a suitable optical input device, such as a webcam, an electronic version of the document can be recalled for editing, or other responsive action can be taken.

U.S. Pat. No. 7,002,704 to Fan ("Method and Apparatus for Implementing Anti-counterfeiting Measures in Personal Computer-based Digital Color Printers") teaches a system for rendering an electronic image representation associated with a software application program. The system includes a PC-based host processor programmed to execute the software application program, a temporary storage device associated with the host processor, and a printer interfaced to the host processor. A printer driver routine is operative on the host processor and determines whether the electronic image representation is of a counterfeit document by examining at least a portion of the electronic image representation when stored in the temporary storage device during the course of printing the electronic image representation at the printer.

The disclosed embodiments provide examples of improved solutions to the problems noted in the above Background discussion and the art cited therein. There is shown in these examples an improved method for embedding miniature security marks within documents and images, utilizing a mark parameters database, graphical user interface, and detection simulator. The method includes predicting detection error rates for each pixel location of a host image, defined as a digital representation of at least one recipient of the miniature security marks. The detection error rates for each pixel are displayed with the host image on a graphical user interface and the desired miniature security mark locations are selected. At least one set of miniature security mark parameters is identified, with the parameters being mark parameters that enable determination of an optimized balance between detectability and visibility of the miniature security marks. The host image with the miniature security mark is displayed on the graphical user interface for review and adjustment by an operator.

In an alternate embodiment there is disclosed a system for embedding miniature security marks within documents and images, utilizing a mark parameters database, graphical user interface, and detection simulator. The system includes means for predicting detection error rates for each pixel location of a host image, defined as a digital representation of at least one recipient of the miniature security marks. The system provides means for detection of the error rates for each pixel. These are displayed with the host image on a graphical user interface and means are provided for selecting the desired miniature security mark locations. The system identifies at least one set of miniature security mark parameters, with the parameters being mark parameters that enable determination of an optimized balance between detectability and visibility of the miniature security marks. The host image with the miniature security mark is displayed on the graphical user interface for review and adjustment by an operator.

In yet another embodiment there is disclosed a computer-readable storage medium having computer readable program code embodied in the medium which, when the program code is executed by a computer, causes the computer to perform method steps for embedding miniature security marks within documents and images, utilizing a mark parameters database, graphical user interface, and detection simulator. The method includes predicting detection error rates for each pixel location of a host image, defined as a digital representation of at least one recipient of the miniature security marks. The detection error rates for each pixel are displayed with the host image on a graphical user interface and the desired miniature security mark locations are selected. At least one set of miniature security mark parameters is identified, with the parameters being mark parameters that enable determination of an optimized balance between detectability and visibility of the miniature security marks. The host image with the miniature security mark is displayed on the graphical user interface for review and adjustment by an operator.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

Figure 1:
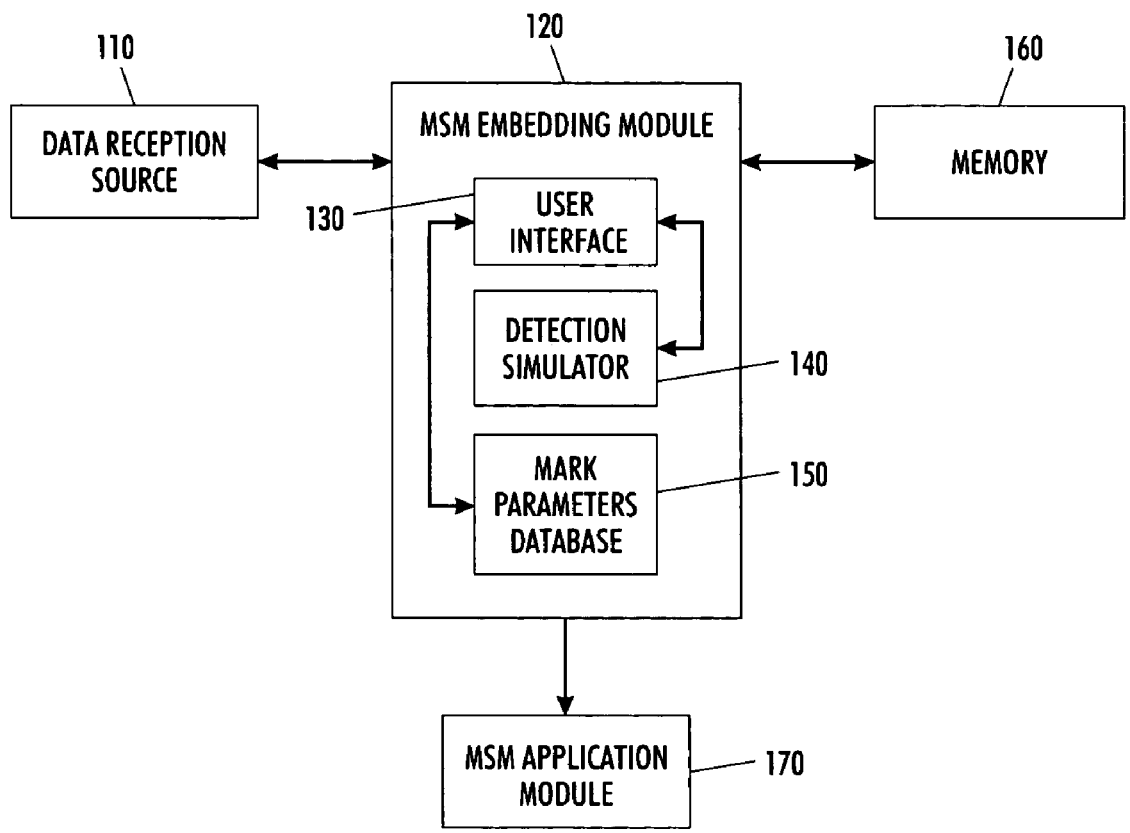
FIG. 1 is a functional block diagram of one exemplary embodiment of a system for embedding MSMs in documents and/or images.

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The semi-automated MSM embedding system and method improve upon the existing methods for embedding MSMs in documents or images. The term "image", as used in this disclosure refers to a graphic or plurality of graphics, compilation of text, a contone or haftone pictorial image, or any combination or subcombination thereof, that is capable of being output on a display device, a marker and the like, including a digital representation of such image. For example, an image may be a combination of graphics, text and pictures that is represented by a series of pixel values denoting the color, intensity, etc., of the particular pixels that make up the image. The system includes a user interface, a detection simulator, and a database that stores mark parameters. The embedding method includes prediction of the detection error rates for each image location through simulation and displays the result on the user interface. Using the prediction information, an operator selects the desired mark locations. The system then automatically selects a set of parameters that maximizes the balance between detectability of the marks and visibility of them according to operator-determined metrics. These parameters may be adjusted by the operator and the results placed in the database.

Various computing environments may incorporate capabilities for supporting a network on which the system and method for embedding MSMs may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Referring to FIG. 1, there is depicted a functional block diagram of one example embodiment of a system for embedding MSMs in documents and/or images. A security mark as used herein can be any mark (e.g., depression, impression, raised, overlay, etc.) that is applied to a recipient such as an image, a graphic, a picture, a document, a body of text, etc. The security mark can contain information that can be detected, extracted and/or interpreted. Such information can be employed to prevent counterfeiting by verifying that the information contained within the security mark is accurate, thereby verifying the authenticity of the recipient upon which the security mark is applied.

As shown in FIG. 1, the system includes data reception source 110, MSM embedding module 120, memory 160, and application module 170. These devices are coupled together via data communication links which may be any type of link that permits the transmission of data, such as direct serial connections, a local area network (LAN), wide area network (WAN), an intranet, the Internet, circuit wirings, and the like. The data reception source 110 receives information from one or more sources (not shown). Such sources can be one or more databases, processing components, etc. that contain information related to one or more products (e.g., currency, passports, visas, banking documents, identification documents, etc.). In some cases, verification of authenticity of the one or more products is of interest to a user. In order to provide a means to verify authenticity, one or more security marks can be placed on the product. Such security marks can be detected and extracted at a later time for verification purposes.

Data can be representative of substantially any desired quantity such as origin of manufacture, date, time, serial number or simply an arbitrary alphanumeric string. In one approach, the data is proprietary such that only a limited number of users can interpret the data.

The MSM embedding module 120 can convert received data into one or more MSM(s), which is placed in a particular configuration. MSMs are small in size (e.g., a size between about 1 micrometer and several hundred micrometers) such that they are virtually invisible to the naked eye. Information from the data reception component 110 can be employed to generate one or more MSMs. The marks that comprise a MSM configuration can be composed via one or more algorithms that convert the received data to a configuration of marks that are representative of the received data. The algorithm can utilize one or more equations, methodologies, work flows, etc. to determine the locations, sizes and/or shapes of the one or more marks. Such a determination can be made based at least in part upon one or more aspects of one or more disparate marks. MSM configurations and characteristics are described more fully in co-pending U.S. application Ser. No. 11/317,768 to Fan ("Counterfeit Prevention Using Miniature Security Marks") and U.S. application Ser. No. 11/472,695 to Fan ("Hierarchical Miniature Security Marks") both assigned to the same assignee of the present application and hereby incorporated by reference in their entirety.

MSM embedding module 120 includes user interface 130, detection simulator 140 and mark parameters database 150. Detection simulator 140 predicts the detection error rates for each pixel location in the recipient host image and the results are displayed on the user interface 130 with the host image. The results may be displayed as separate images on the screen or overlapped. Overlapping may be accomplished, for example, through use of a luminance channel to present the host image and use of chrominance channels to present the detection error rates, or by any other means known in the art. Mark parameters database 150 selects a set of mark parameters that provides the optimum compromise between the detectability and the visibility of the MSMs. Mark parameters may include, for example, color, size, and shape. The metrics applied to optimize the combination of detectability and visibility may be selected by the operator and include ensuring acceptable detectability and minimizing visibility, or ensuring acceptable visibility and maximizing detectability. The host image containing the embedded marks with the selected parameters is displayed on the user interface 130 for review by the operator. Operation of detection simulator 140 and mark parameters database 150 are discussed more fully herein with reference to FIGS. 2-4.

Algorithms can employ substantially any method to determine the location, size, shape, etc. of the data marks and/or anchor marks within a MSM configuration. For example, key dependency, mathematical morphology, etc. can be employed. Algorithms utilizing mathematical morphology can process an image utilizing a structuring element, erosion and/or dilation, for example. Informed embedding can be employed utilizing blind extraction. In one example, various techniques are employed to create compact non-authentic regions and to remove noise due to high quality compression from a false detection map. Utilizing mathematical morphology, the tampered regions can be located and noise (e.g., from lossy compression, etc.) is reduced. In another example, an algorithm that creates a geometrically invariant feature based security mark is created. Such a mark remains constant under rotation, scale, translation, etc.

The memory 160 can contain one or more algorithms, look up tables, etc. in order to provide a method of generating a particular MSM configuration. New algorithms employed by the MSM embedding module 120 can be transmitted to the memory 160. In this manner, algorithms can be stored, viewed, edited, organized and retrieved for subsequent use. Selection of an algorithm can be based on a plurality of factors such as data source, user preference, time constraints, footprint constraints, data constraints, surface type, etc.

The application component 170 can apply one or more security marks received from the MSM embedding module 120 to one or more recipients. In one example, the application component 170 is a printing platform that can place an MSM configuration on a recipient (e.g., paper, velum, acetate, etc.) based at least in part upon commands received from the MSM embedding module 120. In this manner, a print head, an applicator or the like can move to one or more locations relative to the recipient and distribute ink in specified locations to create a particular MSM configuration. In another example, the application component is a laser marking system that removes and/or discolors a surface of the recipient in order to create a particular MSM configuration. It is to be appreciated that the application component 16 can be substantially any device that can create one or more marks on a recipient.

The particular methods performed for embedding MSMs comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
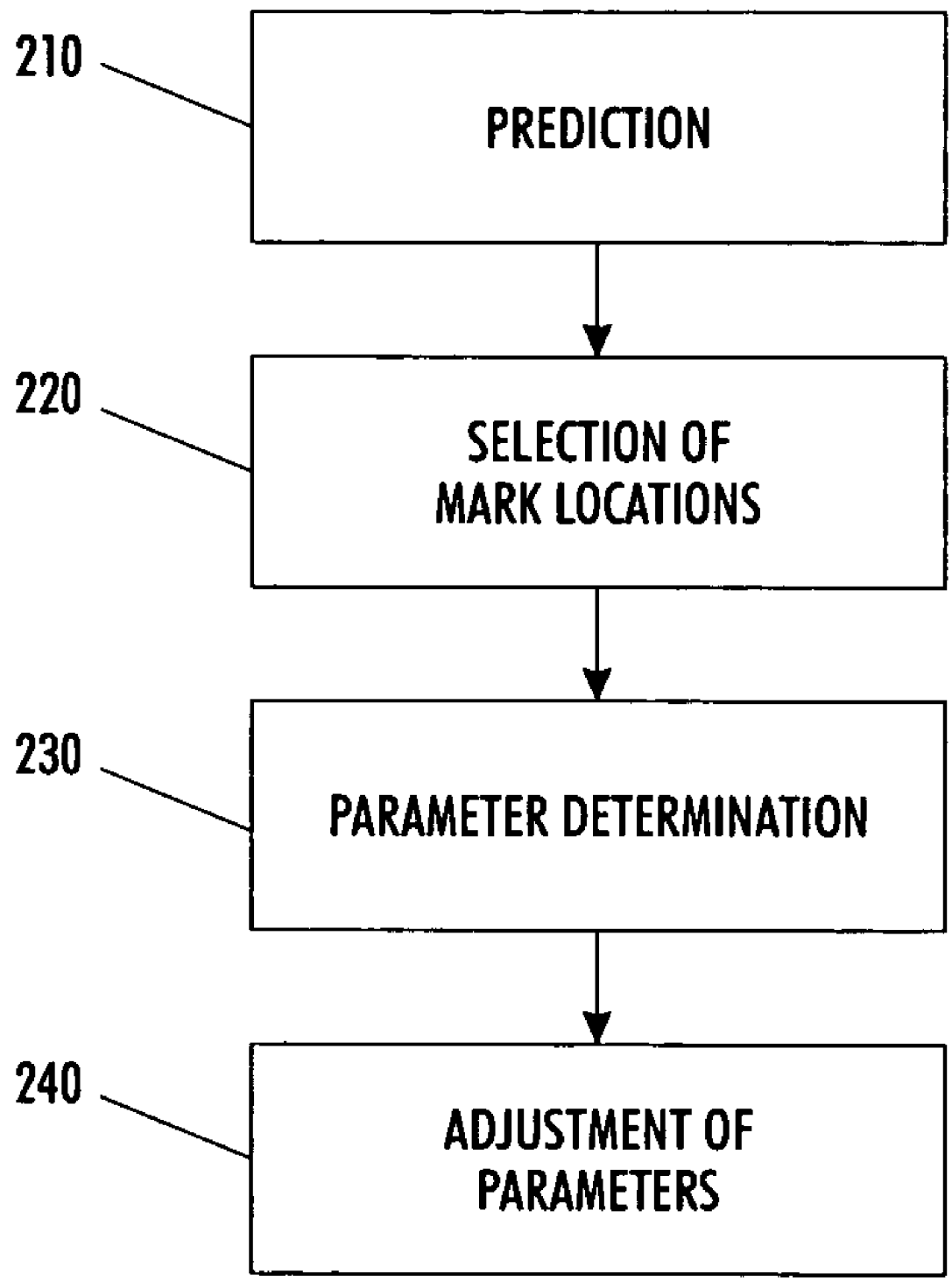
FIG. 2 is a flowchart outlining one exemplary embodiment of the method for embedding MSMs in documents and/or images.

Turning now to FIG. 2, a flowchart illustrates an example embodiment of the method for embedding MSMs in documents and/or images. At 210 detection error rates are predicted for each pixel location of the host image, which is the digital representation of the recipient. Various approaches known in the art may be used to make this determination with one example approach described with more detail in FIG. 3 below. After the detection error rate has been calculated for each pixel, the results are displayed to the operator with the host image. The results and the host image may be displayed separately on a single screen, for example side-by-side, or the images may be overlapped. Various known methods, such as using a luminance channel to show the host image and using chrominance channels to show the detection error rates may be utilized to overlap the images. The operator may then select the desired mark locations at 220. While locations having lower detection errors are generally preferred, other factors, such as balance in location (to avoid concentrations of marks in a single region), may need to be considered.

A set of mark parameters are selected at 230 by the system. The mark parameters provide an optimized balance between the detectability and visibility of the MSMs. While for the purposes of discussion, color is utilized as an example parameter, alternate parameters such as mark size and shape may be used. For the example of color parameters, for each mark, the system identifies the background color, which is the host image color around the mark location. It then searches the database to locate the mark color that will ensure a lower bound for detectability while minimizing visibility. Alternatively, a metric may be applied to impose a limit for visibility while maximizing the detection. It is noted that other metrics that optimize a combination of both detectability and visibility may also be applied, all of which are contemplated by the scope of the discussion and claims herein. The user interface presents various metrics to the operator for selection.

The host image containing the embedded marks with the selected parameters is displayed on the user interface at 240. The operator may modify the mark parameters through the user interface if the selection is not satisfactory. Otherwise, the operator may save the file to memory and complete the embedding process through application of the MSMs by the system application module.

Figure 3:
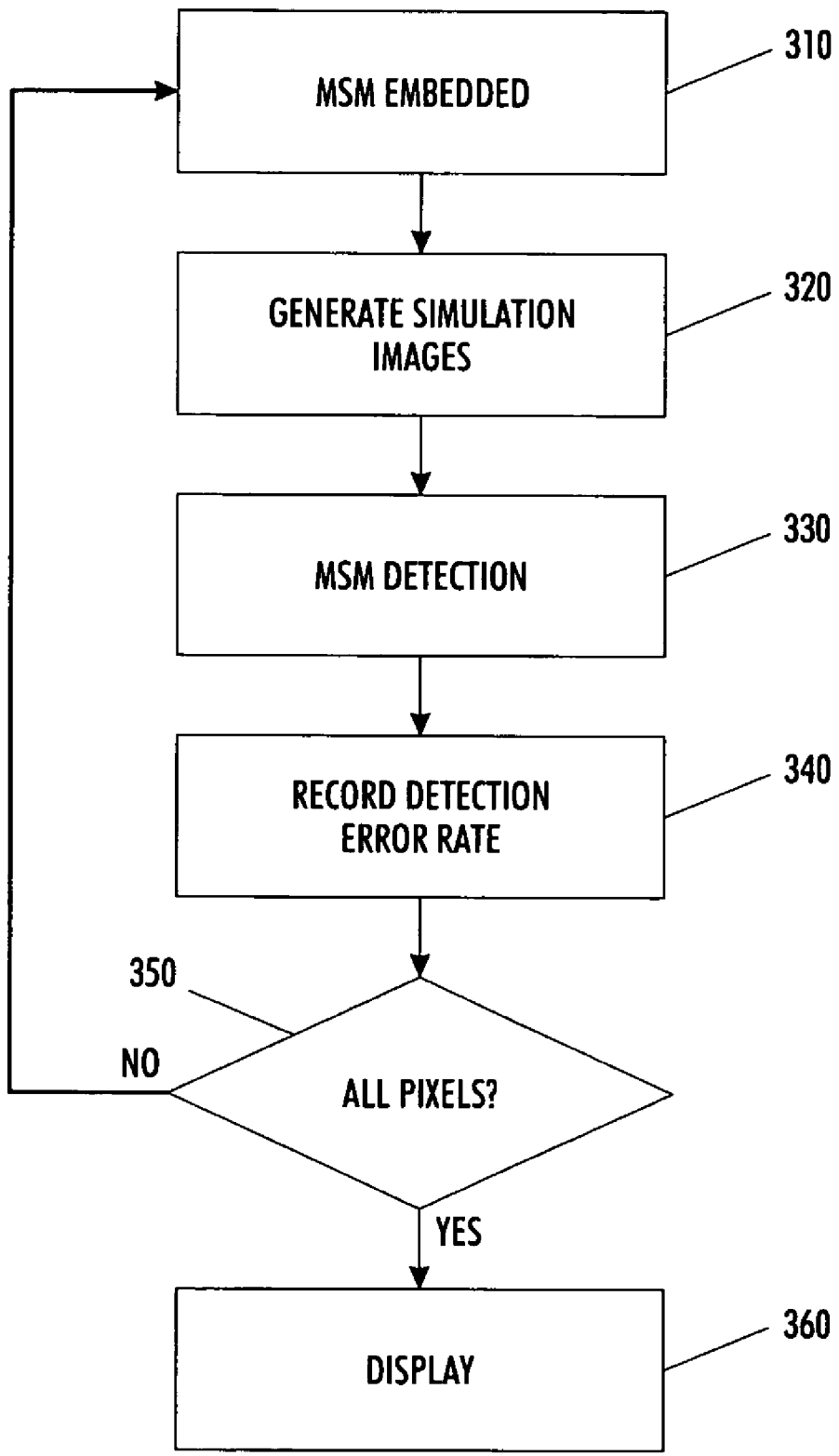
FIG. 3 is a flow chart outlining one exemplary embodiment of prediction of detection error rates.

Turning now to FIG. 3, the flow chart illustrates an example embodiment for the prediction of detection error rates. At 310 an MSM is embedded at a first pixel location of the host image. If it is not possible to embed an MSM at a particular location, for example at the border of the host image, the error rate for the location is labeled as 100% and a next pixel location is identified. The system then selects the parameters for the MSM such that it ensures a sufficient signal to noise ratio for the detection. A set of simulation images is generated at 320 by performing various operations on the embedded host image created at 310. The operations may include but are not limited to rotation, shifting, scaling, and filtering. MSM detection on the simulation images is performed at 330 and the detection rate is recorded at 340. A determination is made at 350 as to whether the detection error rate has been calculated for all of the pixels in the host image. When the detection error rates for all the pixels of the host image have been calculated, the results are displayed on the user interface with the host image at 360. As discussed above, the images may be shown as independent or superimposed images. Various approaches may be utilized to superimpose the images, with one example being use of a luminance channel to show the host image and use of chrominance channels to show the detection error rates.

Figure 4:
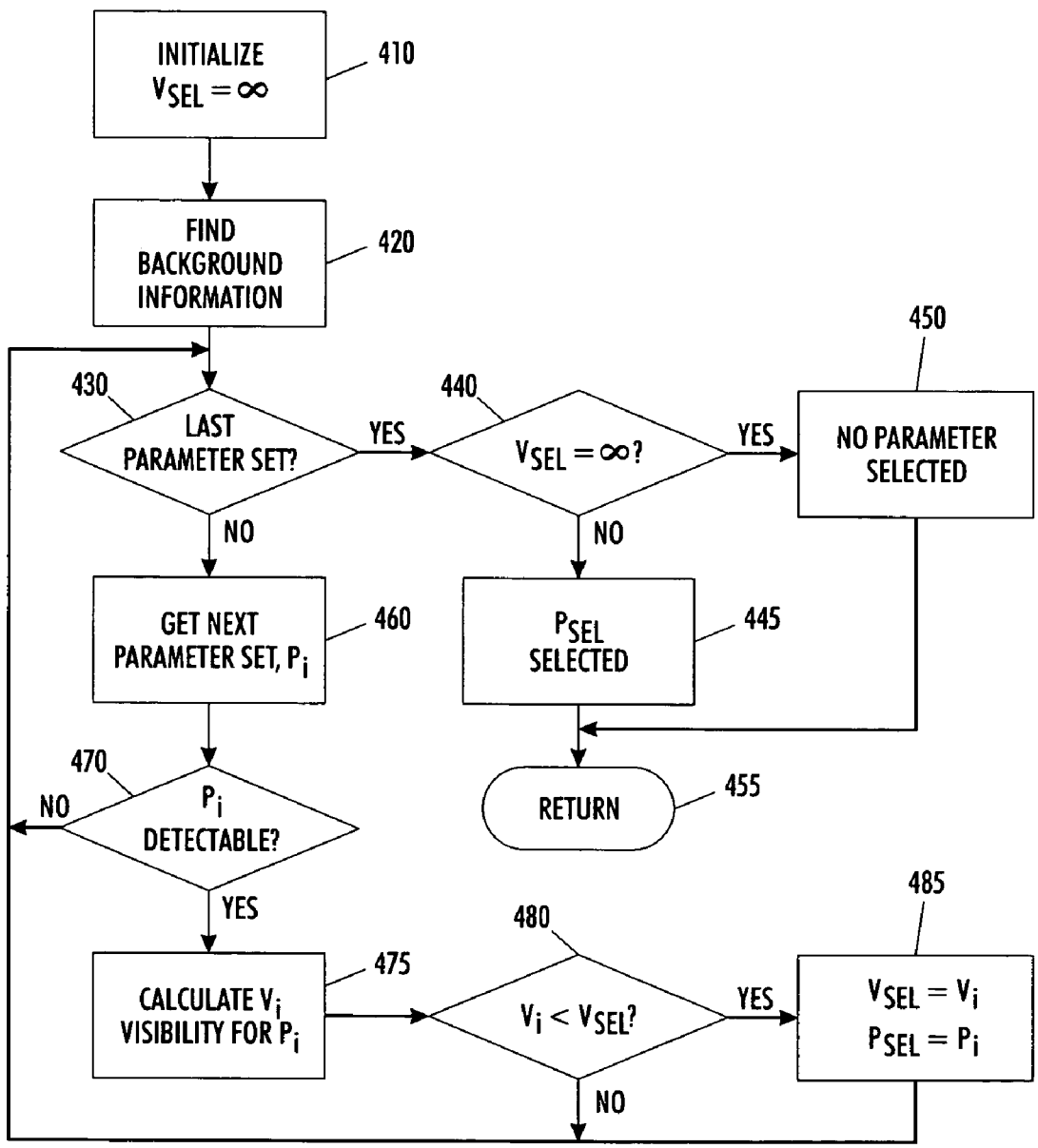
FIG. 4 is a flow chart outlining one exemplary embodiment of parameter determination within the method for embedding MSMs in documents and/or images.

Turning now to FIG. 4, the flow chart illustrates an example embodiment of a method for parameter determination within the method for embedding MSMs in documents and/or images. After mark locations have been determined by the operator, the system automatically selects a set of mark parameters that provides an optimized balance between detectability and visibility of the MSMs. Various parameters, such as mark color (described below with reference to FIG. 5), mark size, mark shape, or any other parameters known in the art may be utilized.

At 410 the system is initialized with the current specified visibility, $V_{sel}$, initially set at infinity. For each mark, the system identifies the host background information for the parameter selected at 420. The system then searches the database to identify the best parameter set that minimizes the mark visibility while its detectability exceeds a pre-determined threshold. A determination is made at 430 as to whether the identified mark parameter set is the last of the parameter set to be checked in the database. If it is the last parameter set to be checked in the database, it is determined whether the visibility equals infinity at 440. If the visibility equals infinity, no parameter is selected at 450 and the system returns a message at 455 that a parameter set satisfying the detection and visibility requirements was not identified. If the visibility does not equal infinity, the selected parameter, $P_{sel}$ is identified at 445 and provided to the operator at 455.

If the parameter is not the last parameter in the mark parameter set to be checked in the database, the next candidate mark parameter in the set, $P_i$, is identified at 460. The system determines whether the candidate parameter satisfies a pre-determined threshold for detectability at 470. The threshold is set by the system and can be modified by the operator. If the detectability threshold is satisfied, the system calculates the resulting visibility for the candidate mark parameter set at 475. If the detectability threshold is not satisfied, the system returns to 430 and selects a new candidate parameter set from the database.

After the visibility, $V_i$, has been calculated, the system determines if the calculated visibility is less than the current specified visibility, $V_{sel}$, at 480. If the calculated visibility is less than the current specified visibility, at 490 the current specified visibility $V_{sel}$ is reset to the calculated visibility ($V_{sel}=V_i$) and the selected mark parameter is set to the candidate mark parameter ($P_{sel}=P_i$). The system then returns to 430 to evaluate another candidate mark parameter until all parameter sets in the database have been tried. Various metrics may be applied to optimize the balance between detectability and visibility, for example minimizing visibility while providing a lower bound for detection as illustrated. Alternatively a metric may be applied to impose a limit for visibility while maximizing detection. Other metrics that optimize a combination of both detectability and visibility may also be used. These options are presented on the system user interface for selection by the operator.

Figure 5:
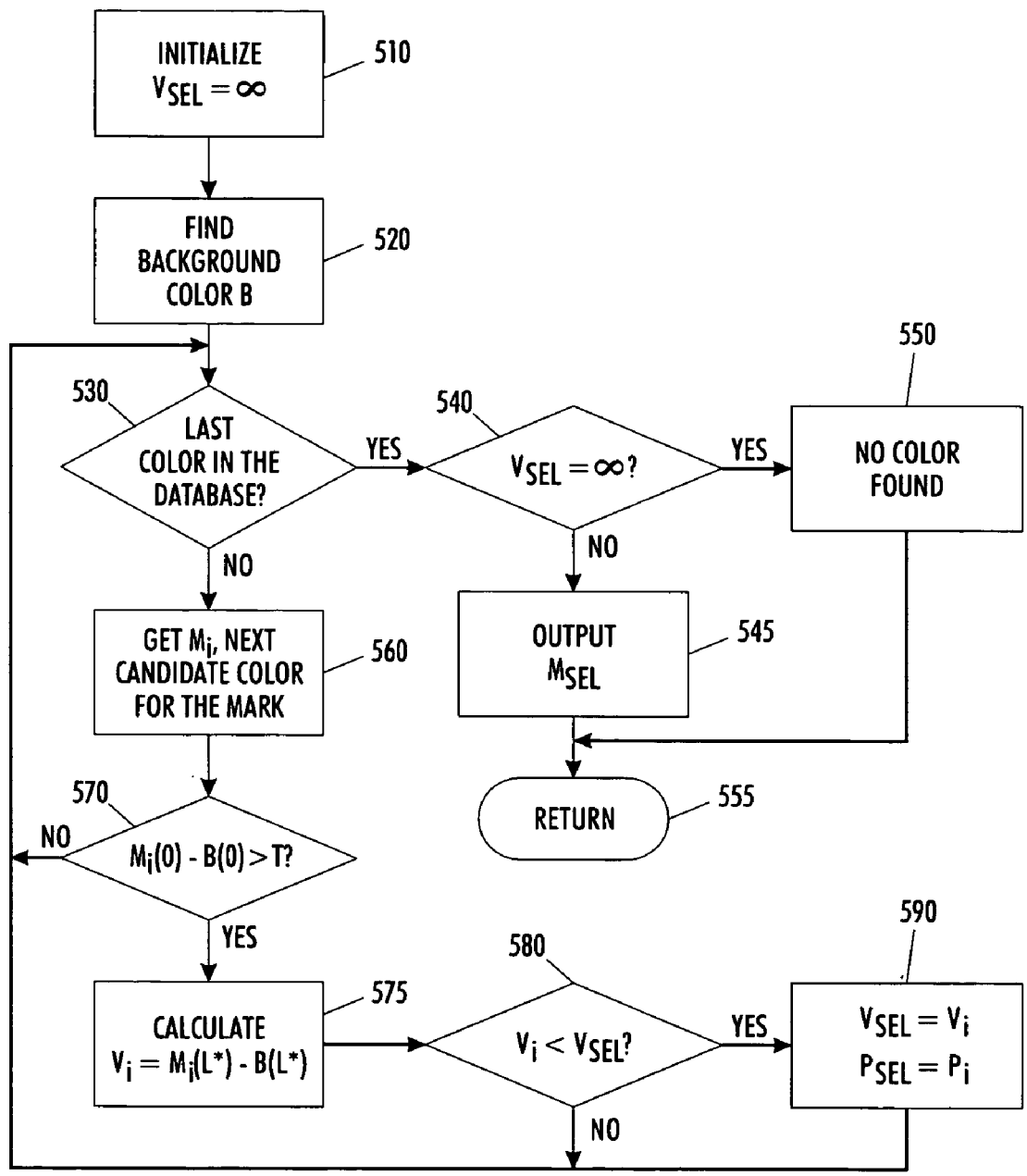
FIG. 5 is a flow chart outlining another exemplary embodiment of parameter determination within the method for embedding MSMs in documents and/or images illustrates.

Turning now to FIG. 5 the flow chart illustrates another example embodiment of a method for parameter determination. After mark locations have been determined by the operator, the system automatically selects a set of mark parameters that provides an optimized balance between detectability and visibility of the MSMs. For the purposes of this embodiment, color is used as an example parameter, but other parameters, such as mark size, and mark shape may be used. At 510 the system is initialized and the current specified visibility, $V_{sel}$, is initially set at infinity. For each mark, the system identifies the background color, B, which is the host image color around the mark location, at 520. The system then searches the database to identify the best mark color that minimizes the difference between the mark color and the background color under the constraint that the mark detectability is greater than a predetermined threshold. A determination is made at 530 as to whether the identified mark color is the last mark color to be checked in the database. If it is the last color to be checked in the database, it is determined whether visibility equals infinity at 540. If the visibility equals infinity, no color is identified at 550 and the system returns a message at 555 that a color was not identified. If the visibility does not equal infinity, the selected color, $M_{sel}$ is identified at 545 and returned to the operator at 555.

If the mark color is not the last color to be checked in the database, the next candidate mark color, $M_i$, is identified at 560. The system determines whether the difference between the candidate mark color and the background color in the color channel that detection is performed is greater than a predetermined threshold for detectability at 570. The threshold is set by the system and may be modified by the operator. If the detectability threshold is exceeded the system calculates the resulting visibility for the difference between the selected color and the background color at 575. If the detectability threshold is not exceeded, the system returns to 530 and selects a new candidate mark color from the database.

After the visibility, $V_i$, has been calculated, the system determines if the calculated visibility is less than the current specified visibility, $V_{sel}$, at 580. If the calculated visibility is less than the current specified visibility, at 590 the current specified visibility is reset to the calculated visibility ($V_{sel}=V_i$) and the selected mark color is set to the candidate mark color ($M_{sel}=M_i$). The system then returns to 530 to evaluate another candidate mark color until all the colors in the database have been tested.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for embedding miniature security marks within documents and images, utilizing a mark parameters database, graphical user interface, and detection simulator, the method comprising:
    predicting detection error rates for each pixel location of a host image, wherein said host image comprises a digital representation of at least one recipient of the miniature security marks;
    displaying said detection error rates for each said pixel and said host image on a graphical user interface:
    selecting desired miniature security mark locations from said displayed detection error rates and said host image;
    identifying at least one set of miniature security mark parameters, wherein said parameters are miniature security mark characteristics which provide an optimized balance between detectability and visibility of said miniature security marks, displaying said host image containing said miniature security marks with said parameters on said graphical user interface; and
    adjusting said mark parameters if said determined set of miniature security mark parameters is not satisfactory.

2. The method according to claim 1, wherein displaying said detection error rates for each said pixel and said host image comprises displaying said host image and said detection error rates as separate images on a single screen of said graphical user interface.

3. The method according to claim 1, wherein displaying said detection error rates for each said pixel and said host image comprises displaying said host image and said detection error rates as overlapped images on a single screen of said graphical user interface.

4. The method according to claim 3, wherein displaying said host image and said detection error rates as overlapped images comprises utilizing a luminance channel to present said host image and utilizing at least one chrominance channel to present said detection error rates.

5. The method according to claim 1, wherein said parameters include color, size, or shape.

6. The method according to claim 1, wherein detecting prediction error rates comprises:
    embedding a miniature security mark in a selected pixel location of said host image;
    generating a set of simulation images by performing at least one operation on said host image with said embedded miniature security mark;
    performing miniature security mark detection on said set of simulation images and obtaining at least one detection error rate;
    recording said at least one detection error rate; and
    determining if detection error rates have been obtained for all pixel locations of said host image.

7. The method according to claim 6, further comprising labeling said detection error rate as 100% if a miniature security mark cannot be embedded at said selected location.

8. The method according to claim 6, wherein said at least one operation includes at least one member selected from the group consisting of rotation, shifting, scaling, and filtering.

9. The method according to claim 1, wherein determining at least one set of miniature security mark parameters further comprises:
    initializing a specified visibility;
    retrieving host image background information for said identified miniature security mark parameters; and
    searching the mark parameters database to identify the best mark parameter that minimizes the visibility of the mark parameter while maintaining detectability.

10. The method according to claim 9, wherein searching the mark parameters database to identify the best mark parameter comprises:
    determining if said identified mark parameter is the last of the mark parameter set to be checked in the mark parameters database;
    if said identified mark parameter is the last of the mark parameter set to be checked in the mark parameters database, determining whether calculated visibility equals said specified visibility;
    if said calculated visibility equals said specified visibility, presenting a message that a parameter satisfying detection and visibility requirements was not identified;
    if said calculated visibility does not equal said specified visibility, presenting the selected parameter on the graphical user interface;

if said identified mark parameter is not the last of the mark parameter set to be checked in the mark parameters database, identifying another candidate mark parameter;

determining if said candidate mark parameter satisfies a threshold for detectability;

if said threshold for detectability is satisfied, calculating the visibility for said candidate mark parameter;

if said threshold for detectability is not satisfied, selecting a new candidate mark parameter and evaluating said detectability threshold until said detectability threshold is satisfied;

determining if said calculated visibility for said candidate mark parameter is less than said specified visibility; and if said calculated visibility for said candidate mark parameter is less than said specified visibility, resetting said specified visibility to said calculated visibility and resetting said selected mark parameter to said candidate mark parameter.

11. The method according to claim 1, wherein said balance between detectability and visibility of said miniature security marks comprises minimizing visibility while providing a lower bound for detection.

12. The method according to claim 1, wherein said balance between detectability and visibility of said miniature security marks comprises imposing a limit for visibility while maximizing detection.

13. The method according to claim 1, wherein determining at least one set of miniature security mark parameters comprises selecting color as said parameter.

14. The method according to claim 13, further comprising:
initializing a specified visibility;
retrieving the background color, wherein said background color comprises the color of said host image around the mark location; and
searching the mark parameters database to identify the best mark color that minimizes the difference between the color of the miniature security mark and said background color while maintaining detectability.

15. The method according to claim 14, wherein searching the mark parameters database to identify the best mark color comprises:
determining if said identified mark color is the last mark color to be checked in the mark parameters database;
if said identified mark color is the last mark color to be checked in the mark parameters database, determining whether calculated visibility equals said specified visibility;
if said calculated visibility equals said specified visibility, presenting a message that a mark color satisfying detection and visibility requirements was not identified;
if said calculated visibility does not equal said specified visibility, presenting said identified mark color on the graphical user interface as the selected color;
if said identified mark color is not the last mark color to be checked in the mark parameters database, identifying another candidate mark color;
determining if said candidate mark color satisfies a specified threshold for detectability;
if said threshold for detectability is satisfied, calculating the visibility for said candidate mark color;
if said threshold for detectability is not satisfied, selecting a new candidate mark color and evaluating said detectability threshold until said detectability threshold is satisfied;
determining if said calculated visibility for said candidate mark color is less than said specified visibility; and
if said calculated visibility for said candidate mark color is less than said specified visibility, resetting said specified visibility to said calculated visibility and resetting said selected mark color to said candidate mark color.

16. A system for embedding miniature security marks within documents and images, utilizing a mark parameters database, graphical user interface, and detection simulator, the system comprising:
means for predicting detection error rates for each pixel location of a host image, wherein said host image comprises a digital representation of at least one recipient of the miniature security marks;
means for displaying said detection error rates for each said pixel and said host image on a graphical user interface:
means for selecting desired miniature security mark locations from said displayed detection error rates and said host image;
means for identifying at least one set of miniature security mark parameters, wherein said parameters are miniature security mark characteristics which provide an optimized balance between detectability and visibility of said miniature security marks,
means for displaying said host image containing said miniature security marks with said parameters on said graphical user interface; and
means for adjusting said mark parameters if said determined set of miniature security mark parameters is not satisfactory.

17. The system according to claim 16, wherein said parameters include color, size, or shape.

18. The system according to claim 16, wherein means for detecting prediction error rates comprises:
means for embedding a miniature security mark in a selected pixel location of said host image;
means for generating a set of simulation images by performing at least one operation on said host image with said embedded miniature security mark;
means for performing miniature security mark detection on said set of simulation images and obtaining at least one detection error rate;
means for recording said at least one detection error rate; and
means for determining if detection error rates have been obtained for all pixel locations of said host image.

19. The system according to claim 16, wherein means for determining at least one set of miniature security mark parameters further comprises:
means for initializing a specified visibility;
means for retrieving host image background information for said identified miniature security mark parameters; and
means for searching the mark parameters database to identify the best mark parameter that minimizes the visibility of the mark parameter while maintaining detectability.

20. A non-transitory computer-readable storage medium having computer readable program code embodied in said medium which, when said program code is executed by a computer causes said computer to perform method steps for embedding miniature security marks within documents and images, utilizing a mark parameters database, graphical user interface, and detection simulator, the method comprising:
predicting detection error rates for each pixel location of a host image, wherein said host image comprises a digital representation of at least one recipient of the miniature security marks; displaying said detection error rates for each said pixel and said host image on a graphical user interface: selecting desired miniature security mark locations from said displayed detection error rates and said host image; identifying at least one set of miniature security mark parameters, wherein said parameters are miniature security mark characteristics which provide an optimized balance between detectability and visibility of said miniature security marks, displaying said host image containing said miniature security marks with said parameters on said graphical user interface; and adjusting said mark parameters if said determined set of miniature security mark parameters is not satisfactory.

* * * * *